United States Patent [19]

Kasuga

[11] Patent Number: 5,440,192
[45] Date of Patent: Aug. 8, 1995

[54] ULTRASONIC MOTOR

[75] Inventor: Masao Kasuga, Tokyo, Japan

[73] Assignee: Seiko Instruments Inc., Japan

[21] Appl. No.: 232,873

[22] Filed: Apr. 25, 1994

Related U.S. Application Data

[63] Continuation of Ser. No. 140,272, Oct. 20, 1993, abandoned, which is a continuation of Ser. No. 41,273, Mar. 30, 1993, abandoned, which is a continuation of Ser. No. 766,828, Sep. 26, 1991, abandoned, which is a continuation of Ser. No. 201,053, Jun. 1, 1988, abandoned.

[30] Foreign Application Priority Data

Jun. 4, 1987 [JP] Japan ............................. 140402
Aug. 10, 1987 [JP] Japan ............................. 199498

[51] Int. Cl.⁶ .......................................... H01L 41/08
[52] U.S. Cl. ..................................................... 310/323
[58] Field of Search ................................ 310/323, 328

[56] References Cited

U.S. PATENT DOCUMENTS

| | | | |
|---|---|---|---|
| 4,484,099 | 11/1984 | Kawai et al. ............... | 310/328 |
| 4,645,964 | 2/1987 | Hiramatsu et al. .......... | 310/328 X |
| 4,649,311 | 3/1987 | Mokohjima et al. ......... | 310/328 X |
| 4,672,256 | 6/1987 | Okuno et al. ............... | 310/328 X |
| 4,678,956 | 7/1987 | Izukawa et al. ............. | 310/328 X |
| 4,692,651 | 9/1987 | Hiramatsu et al. .......... | 310/328 X |
| 4,723,085 | 2/1988 | Mokohjima et al. ......... | 310/328 |
| 4,734,610 | 3/1988 | Okumura et al. ............ | 310/328 X |

FOREIGN PATENT DOCUMENTS

| | | | |
|---|---|---|---|
| 2910699 | 10/1979 | Germany . | |
| 0018369 | 1/1986 | Japan ............... | 310/323 |
| 0018370 | 1/1986 | Japan ............... | 310/323 |
| 0022778 | 1/1986 | Japan ............... | 310/323 |
| 0035176 | 1/1986 | Japan ............... | 310/323 |
| 0139279 | 6/1986 | Japan ............... | 310/323 |
| 0139282 | 6/1986 | Japan ............... | 310/323 |
| 0100179 | 5/1987 | Japan ............... | 310/323 |
| 0242181 | 10/1988 | Japan ............... | 310/323 |

OTHER PUBLICATIONS

Patent Abstracts of Japan, vol. 10, No. 168 (E-411) (2224) Jun. 14, 1986.
Patent Abstracts of Japan, vol. 11, No. 138 (E-503) (2585) May 2, 1987.
Patent Abstracts of Japan, vol. 9, No. 173 (E-329) (1896) Jul. 18, 1985.
Patent Abstracts of Japan, vol. 10, No. 170 (E-412) (2226) Jun. 17, 1986.

*Primary Examiner*—Mark O. Budd
*Attorney, Agent, or Firm*—Adams & Wilks

[57] ABSTRACT

A thin, small-diameter, and efficient ultrasonic motor using a component of flexible travelling waves comprises a base, a stator and a rotor. The stator has an elastic vibrating body and a ceramic piezoelectric vibrator provided on one side of the elastic vibrating body. A central portion of the stator is secured and freely supported by a central support shaft.

21 Claims, 3 Drawing Sheets

ULTRASONIC MOTOR

This is a continuation of application Ser. No. 140,272 filed Oct. 20, 1993 now abandoned which is a continuation of application Ser. No. 041,272 filed Mar. 30, 1993 now abandoned which is a continuation of application Ser. No. 766,828 filed Sep. 26, 1991 now abandoned which is a continuation of application Ser. No. 201,053 filed Jun. 1, 1988 now abandoned.

FIELD OF THE INVENTION

This invention relates to a compact ultrasonic motor using ultrasonic oscillation, and more particularly to ultrasonic motor having a electro-mechanical transducer for generating travelling wave and a generating movable member driven by the travelling wave.

BACKGROUND OF THE INVENTION

Two types of the ultrasonic motor are conventionally known. One is a standing-wave type motor which employs a Langevin oscillator as a driving source. This type of motor is disclosed in U.S. Pat. No. 4,019,073. The other is a travelling-wave type motor in which a travelling wave is generated on a stator for driving a rotor provided on the stator. The travelling-wave motor generates smaller wear at the friction-transmission surface between the stator and the rotor, and is easier drive in a reverse-rotation direction in comparison with the standing-wave type motor. Such a travelling-wave motor is disclosed in U.S. Pat. No. 4,513,219 to Katsuma et al., U.S. Pat. No. 4,562,374 to Sashida and European Pat. Appl. Pub. No. 169297 of Tokushima. Katsuma et al. and Sashida disclose a travelling-wave motor employing a ling type of a piezoelectric member. This type of travelling-wave motor essentially consists of an annular vibrating body and a movable body provided thereon. The vibrating body has an annular piezoelectric vibrator thereon. The vibrating body is fixed to a base through a supporting mechanism. On the annular type piezoelectric vibrator, a gap portion with the length of half of the arc of an electrode is provided between two electrode groups. The travelling wave is vibrated by applying an AC signal having a phase difference of 90° to the two groups.

Another type of travelling-wave motor employing a disk-shaped piezoelectric member is disclosed in the European Patent Application of Tokushima. In such motor, a stator is a disk-shaped elastic vibrating body having a toothlike circular protrusion. The vibrating body has a disk-shaped piezoelectric vibrator thereon. A movable body is provided on the protrusion of the vibrating body and has a central shaft for rotational guide. A pressure-regulating mechanism is provided on the central shaft for making suitable contact pressure between the vibrating body and the movable body to efficiently conduct the travelling wave component to the movable body. The vibrating body is supported and fixed on two circular protrusions formed on a base. The disk-shaped piezoelectric vibrator consists of a plurality of sector electrode interposed in such a manner that the piezoelectric vibrator slips by a half pitch of the arc length, the piezoelectric vibrator having an even number of electrodes in the circumferential direction in such a manner that each electrode has the same arc length.

In a travelling-wave motor of the type described above if the structure thereof is, so constituted that an annular vibrating body is included, the travelling wave is significantly damped to a certain degree due to a supporting mechanism since the flexible travelling wave which has been excited by a piezoelectric vibrator includes no nodal point of oscillation. As a result of this, electrical-mechanical transducing efficiency is deteriorated. If the structure of the travelling-wave motor is so constituted that a disc-type of vibrating body is included, an advantage is obtained in which the vibrating body can be fixed and supported by two places in the radial direction of the base by the base because the vibrating body is excited in a secondary oscillation mode in the radial direction of the vibrating body. However, the above-described deterioration in efficiency occurs due to the dispersion in the position of the nodal points and the magnitude of the supporting force. As the diameter and the thickness are decreased, the affection inevitably increases. Furthermore, since the disk type motor employs the movable body which is and, integrally formed with the central shafts, the shafts must be supported by means of bearing member provided in the movable body. If the ring type motor employs such movable body, a bearing member is required to be provided in the base. Furthermore, since the structure of a piezoelectric vibrator of the type described above is constructed in such a manner that the neighboring electrodes are polarized in a different direction with respect to each other, it is necessary to provide a proper gap between the electrodes for the purpose of preventing leaks or cracks and so on due to concentration of stress generated during polarization in a high electric field. Therefore, gaps of a proper width between, neighboring electrodes are provided. In general, a suitable width of the gap is considered to be substantially twice the thickness of the piezoelectric oscillator. These gaps raise a problem in that the phases of the travelling waves or the amplitude of the travelling waves deteriorate. Furthermore, since these gaps are the unsaturated portions left from polarization of the neighboring electrodes in different directions, the wavelengths of each travelling wave are non-uniform. Furthermore, when a device with a small diameter or a device of a low electricity consumption is intended to be realized, such structure in which most of the circumferential portion are occupied by input electrodes interrupt them.

SUMMARY OF THE INVENTION

It is therefore an object of the present invention to provide a ultrasonic motor having a thin small diameter.

It is another object of the present invention to provide an ultrasonic motor which avoids deterioration in the component of the travelling wave due to the supporting mechanism for the vibrating body.

It is further object of the present invention to provide an ultrasonic motor being capable of easily adjusting the contact pressure between the movable body and the vibrating body.

It is still another object of the present invention to provide an ultrasonic motor with a low electricity consumption.

It is a still further object of the present invention to provide a piezoelectric vibrator employed in an ultrasonic motor without slip of phases of the travelling wave generated thereon.

It is yet another object of the present invention to provide a piezoelectric vibrator in an ultrasonic motor without deterioration in the strength of the travelling wave component caused by overlap due to deterioration in the amplitude of standing wave component excited in each electrodes.

These and other object of the present invention are accomplished by an ultrasonic motor comprising a fixture body for fixing the ultrasonic motor on the outer surface, the fixture body having supporting means such as shaft; a vibrating body secured and supported with the supporting means; a piezoelectric vibrator secured to one side of the vibrating body for generating travelling waves in the vibrating body; a movable body provided on the vibrating means and rotationally drove by the vibrating body; and a pressure-regulator provided on the movable body for generating suitable contact pressure between the movable body and the vibrating body.

According to the above-described structure, the central portion of the vibrating body is supported in such a manner that the vibrating body is integrally formed with the central shaft. As a result of this, though the vibrating body has a thin and small-diameter structure, the vibrating body can be stably and easily supported substantially preventing occurrence of damping of travelling wave.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiments presented hereinbelow, and the accompanying drawings, which are given by way of illustration only and are not intended to limit the present invention, and wherein.

DETAILED DESCRIPTION OF THE PREFERRED EMBODIMENTS

Figure 1:
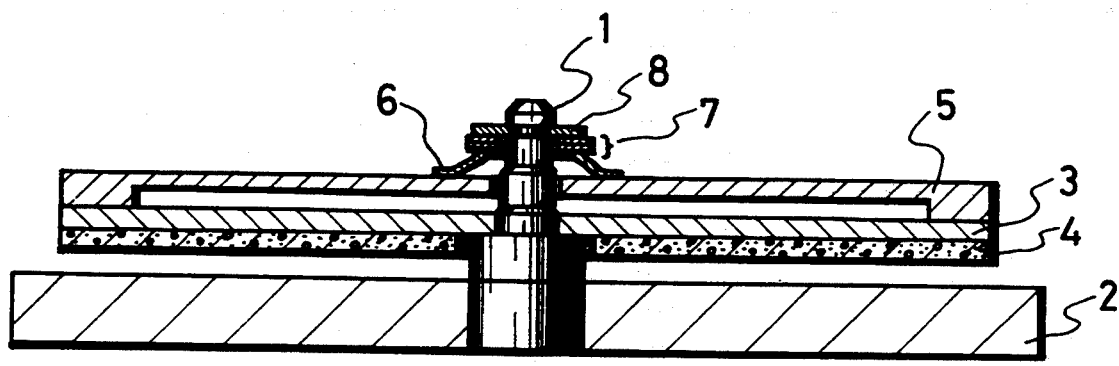
FIG. 1 illustrates a vertical cross-sectional view of an ultrasonic motor according to the present invention.

FIG. 1 is a vertical cross-sectional view of an ultrasonic motor according to the present invention. A central support shaft 1 is integrally formed with a base 2. A vibrating body 3 is integrally formed with the central shaft 1 at the central portion thereof. The vibrating body 3 has a center hole formed therein, and the central shaft 1 extends through the center hole and is fixedly secured to the vibrating body 3 at the center hole. In this case, the vibrating body 3 is made of an elastic material such as stainless steel, brass or duralmin, and is supported by the central shaft 1 at its central portion. In the embodiment shown in FIG. 1, the central support shaft has a stepped configuration comprised of first, second and third axially disposed portions of different diameters. A piezoelectric vibrator 4 is formed by at least one or more piezoelectric ceramic plates having a central aperture. The vibrator 4 may also consist of several pieces of piezoelectric ceramic plates which are divided in the circumferential direction. The vibrating body 3 and the piezoelectric vibrator 4 jointly define a multi-layer stator member. Several patterned electrodes are provided in the circumferential direction, and the piezoelectric vibrator is polarized. The polarized piezoelectric vibrator 4 is put on one side of the vibrating body 3 and has a center hole through which extends the central shaft 1. A rotor member in the form of a movable body 5 has in the central portion thereof a guide hole so as to rotate about an axis defined by the central shaft 1. The movable body 5 is arranged to be biased into contact with the vibrating body by means of a pressure regulating mechanism defined by a spring member 6, washers 7 and a stopper 8. The thus-described pressure regulating mechanism controls the contact pressure between the vibrating body 3 and the movable body 5 to be most suitable for efficient conduction of the travelling wave component to the movable body 5 for the purpose of converting the travelling wave component to rotational motion, the travelling wave component being generated in the vibrating body 3 and the piezoelectric vibrator 4. Furthermore, the pressure-regulating mechanism is provided on the central shaft, causing the slight adjustment of the contact pressure of the movable body against the vibrating body when the movable body is pressurized and brought into contact with the vibrating body to be conducted easily. Consequently, the movable body can be rotated at most suitable contact pressure.

The pressure regulating mechanism according to this embodiment conducts the regulation of the contact pressure by way of changing the spring member 6 such as a leaf spring or cross spring or increase or decrease in the number of the washers 7. However, as an alternative to the stopper 8 a C-ring or E-ring, or a double-nut can be used for regulating the pressure.

The movable body 5 is constituted in such a manner that the same is brought into contact only with the outer surface of the vibrating body 3. Therefore, even if the vibrating body 3 is formed by a thin flat elastic material, the travelling wave component excited by the vibrating body 3 can be uniformly conducted to the movable body 5. Due to the provision of the above-described structure, a thin and small-diameter vibrating body 3 and a movable body can be realized. Furthermore, in order to make the outer surface of the vibrating portion 3 the maximum displacement portion in the radial direction, the excitation is conducted at a driving frequency in which a resonance occurs in the primary vibration mode. This fact helps to realize a vibrating circuit and a driving circuit exhibiting a low electric current consumption due to an advantage in that low frequencies can be used.

Figure 2:
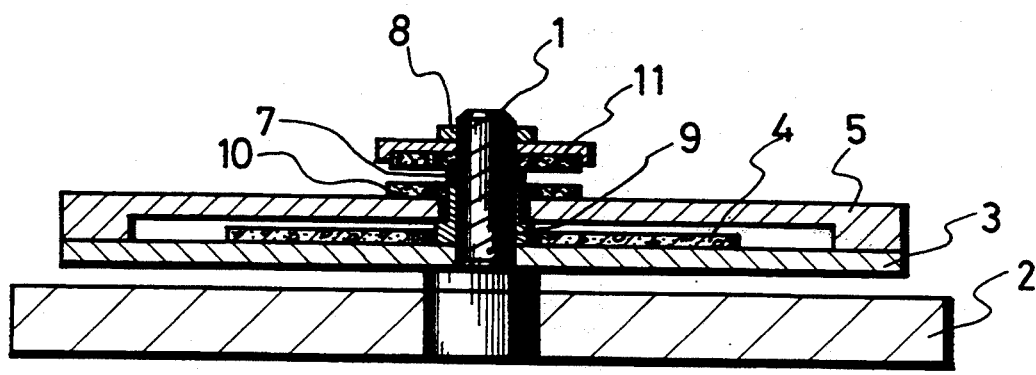
FIG. 2 illustrates a vertical cross-sectional view of an ultrasonic motor according to another embodiment of the present invention.

FIG. 2 is a vertical cross-sectional view of an ultrasonic motor according to another embodiment of the present invention. The vibrating body 3 is integrally supported with the central shaft 1 at the central portion thereof, the central shaft 1 being formed integrally with the base 2. The piezo electric vibrator 4 is placed on the upper surface of the vibrating body 3 for the purpose of reducing the overall width. The outer diameter of the piezoelectric vibrator 4 is made smaller than that of the vibrating body 3 for the purpose of reducing the total static capacity of the piezoelectric vibrator 4. As a result of this, a low electric current consumption device can be realized. In general, as the thickness of the piezoelectric vibrator 4 is decreased, the strength of the electrical field is increased, causing the device to be able to be driven at a low voltage. On the other hand, the static capacity increases, causing the electric current to be increased. Therefore, such decreasing in the diameter of the piezoelectric vibrator 4 becomes desirable.

In this embodiment, the pressure regulating mechanism utilizes the magnetic repelling power between two permanent magnets. The structure is so constituted that a magnet 10 provided on the movable body and another magnet 11 which is abutted by a stopper 8 repel each other for the purpose of bringing the movable body 5 into abutment with the vibrating body 3. A guide member 9 stationally supports the vibrating body 3 and acts as a guide for rotation of the movable body 5. Washers 7 regulate the contact pressure.

Figure 3:
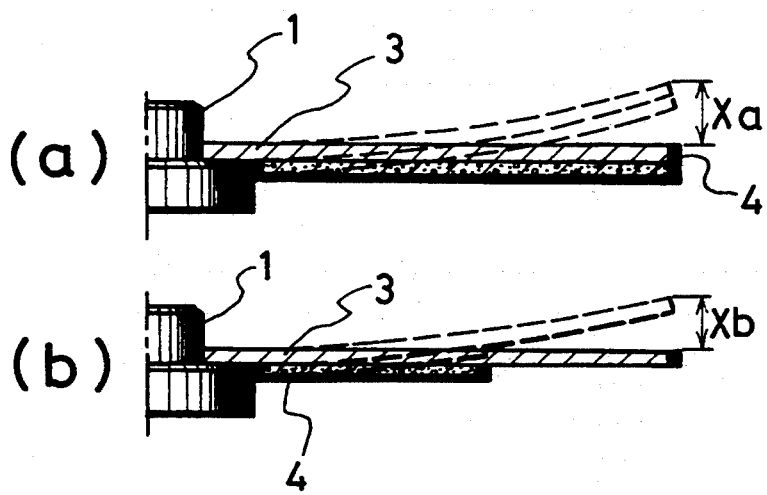
FIGS. 3(a) and 3(b) illustrate the operation of a vibrating portion according to the present invention, the operation being in the radical direction.

FIG. 3 illustrates the operation of the vibrating body according to the present invention, the operation being conducted in the radial direction. On one side of the vibration body 3 whose central portion is secured and supported by the central shaft 1, the piezoelectric vibrator 4 is joined, as a result of which, the vibrating body 3 and the piezoelectric vibrator 4 are integrally operated in the primary vibration mode in which the outer surface is displaced maximum. FIG. 3(a) shows a case in which the outer diameter of the vibrating body 3 and that of the piezoelectric vibrator 4 are the same, and in which an operation in a circular form shown by dashed line is conducted. On the other hand, FIG. 3(b) shows a case in which the diameter of the piezoelectric vibrator 4 is smaller than that of the vibrating body 3. In the portion in which the piezoelectric vibrator 4 is joined, the operation forms a circular shape, while in the outer portion, the vibrating body 3 acts in a straight line like a so-called displacement expanding mechanism. The comparison of the maximum displacements shows that Xa is larger than Xb, however, the structure shown in FIG. 3(b) having the displacement expansion mechanism is very effective to realize a low electric current consumption device.

Figure 4:
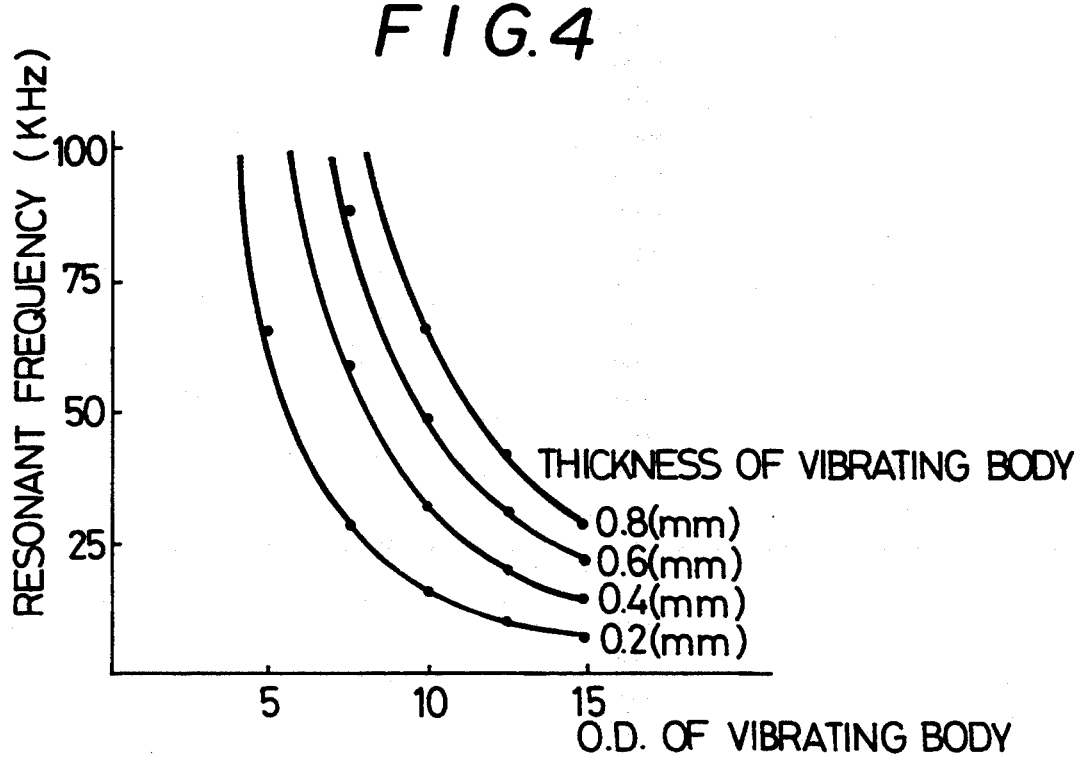
FIG. 4 is a graph which illustrates the relationship between the shape of the vibrating body and the mechanical resonant frequency.

FIG. 4 illustrates the relationship between the shape of the vibrating body according to present invention and the mechanical resonant frequency. As illustrated, the material of the vibrating body 3 is brass, and the relationship between the outer diameter of the vibrating body (the piezoelectric vibrator is joined to the vibrating body) and mechanical resonant frequency in a case in which three waves are generated in the circumferential direction, the illustration being made by changing the thickness of the vibrating body. By way of securing and supporting the central portion of the vibrating body 3 and reducing the diameter of the same, the mechanical resonant frequency increases. As a result of this, the vibration circuit and the drive circuit forming the ultrasonic motor is loaded. Therefore, it is effective to realize the low electric current consumption that the mechanical resonant frequency is set at as low level as possible but exceeding 20 kHz which is called an ultrasonic wave. In order to achieve this object, the thickness of the vibrating body may be set to a thin value. As described above, as the thickness of the piezoelectric vibrator is decreased, the electrical field is strengthened, causing the low voltage drive to be realized. Considering the easiness of flexible vibration and prevention of cracks, the value is preferable to be made at 0.10 to 0.20 mm. As can be clearly seen from this fact, when the outer diameter of the vibrating body is made 10 mm, it is considered to be preferable to set the overall width of the vibrating body to 0.3 to 0.6 mm. Therefore, the thickness of the elastic material forming the vibrating body 3 is preferably similar to or slightly thicker than that of the piezoelectric vibrator 4 for the purpose of improving the efficiency of the ultrasonic motor having the structure described above. Furthermore, as for the flexible travelling wave generated in the circumferential direction of the vibrating body, as the number of the waves exciting in the same form increases, the mechanical resonant frequency is increased, therefore, the number of the waves is preferable to be 2 to 4 in the viewpoint of stably rotating the movable body 5.

Figure 5:
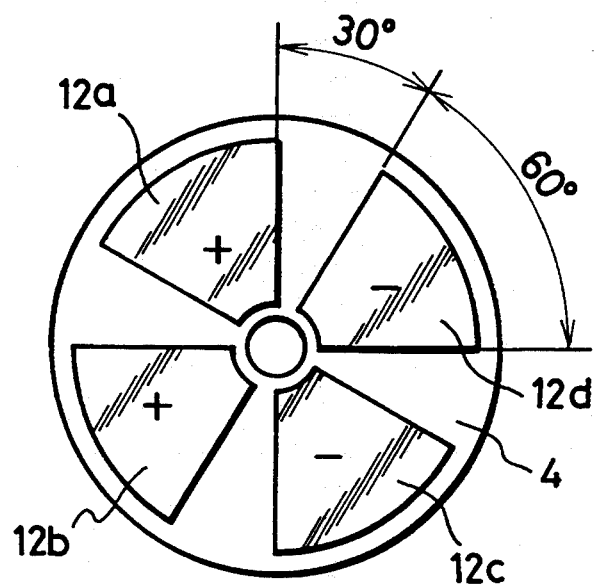
FIG. 5 illustrates a plan view of a piezoelectric vibrator.

FIG. 5 is a plan view of the piezoelectric vibrator 4. The piezoelectric vibrator 4 having in the central portion thereof a hole is provided with sector electrodes 12a to 12d on the surface thereof separated by gaps. Between the electrodes, each gap has half the arc length of the arc length of the electrodes it separates. When high frequency voltages having the different phases respectively are input to each electrode, after polarization has been conducted in such a manner that the polarities illustrated in the figure is realized a, travelling-wave component is excited. The spaces shown as + are the spaces which are polarized by applying a + electrical field to the reverse electrodes. The spaces shown as − are the spaces which are polarized by applying a − electrical field to the reverse electrodes. In this case, the reverse electrodes may be the electrodes at the same position and of the same shape as those in the right side or may constituted an entire-surface electrode. In this embodiment, if sine waves are, for example, input to the electrodes 12a and 12c, travelling wave components having three waves in the different travelling directions circumferential to the electrodes can be obtained by inputting high frequency voltage each of which has a phase difference of ±90° in time period. According to the structure of the electrodes of the piezoelectric vibrator according to the present invention, the number of waves of the travelling-wave component to be excited becomes the integer multiple of three. Thanks to the thus-excited travelling wave component, since the arc length of each electrode for inputting is equivalent to half wavelength of the travelling wave, a slip of the phases of the travelling waves and a deterioration in the strength of the travelling wave component due to the overlap of the waves when the amplitude of the standing wave component which is exited in each electrode can be improved. Furthermore, since a uniform gap is respectively provided between the electrodes, means for realizing low electric current consumption can be provided. Therefore, the present invention is effective in application to electronic clocks, or drive motors for tape recorders in which a relatively high speed torque is needed.

Figure 6:
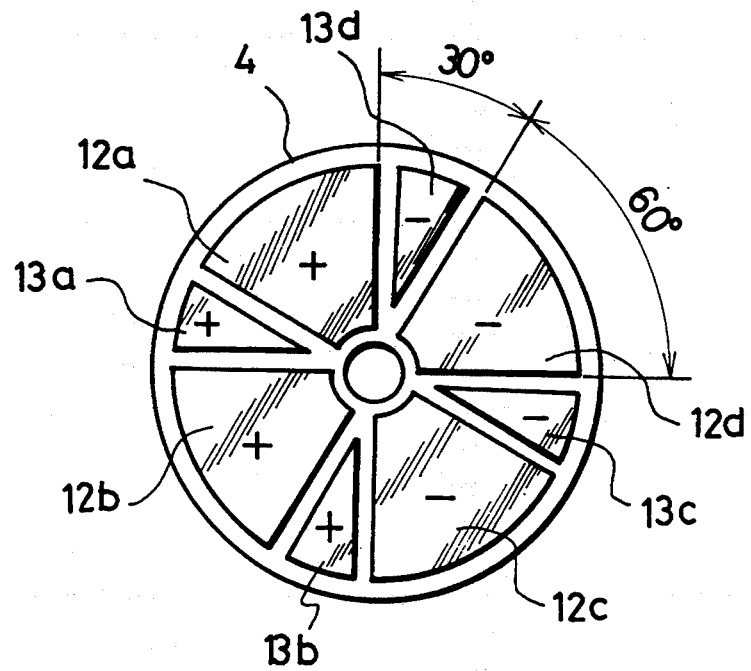
FIG. 6 illustrates a plan view of another piezoelectric vibrator.

FIG. 6 illustrates the substantially same as that shown in FIG. 5. In this embodiment the gap portions between the electrodes 12a to 12d formed on the piezoelectric vibrator 4, electrodes 13a to 13d which do not any input are provided. In this case, the electrodes 13a to 13d are in main used to act for detection, and are able to be used to follow the frequency of the ultrasonic motor or speed change by using the levels of the back-voltage and phases of the same as a detection signal.

Although the present invention has been described in connection with particular embodiments thereof, additional embodiments, applications and modifications, which will be obvious to those skilled in the art, are included within the spirit and scope of the invention.

I claim:

1. An ultrasonic motor comprising: a base; a support shaft fixed to the base, the support shaft having a stepped configuration comprised of at least first and second axially disposed portions of different diameters, the first portion having a larger diameter than the second portion and being fixed to the base; a stator comprising a vibrating body and an electrostrictive body, the vibrating body having a center hole through which extends the second portion of the support shaft and the vibrating body being fixed to the second portion of the support shaft and being in contact with a part of the first portion of the support shaft, and the electrostrictive body being secured to one side of the vibrating body for exciting the same to vibrate and having a center hole through which extends the support shaft; a rotor having a center hole through which extends the support shaft and being mounted on the support shaft so as to be rotationally driven around the support shaft by the stator when the electrostrictive body is excited; and pressure regulating means for biasing the rotor into pressure contact with the stator.

2. An ultrasonic motor according to claim 1; wherein the support shaft has a third portion disposed axially from the second portion and having a smaller diameter than the second portion, the rotor center hole having a larger diameter than the diameter of the third portion of the support shaft which extends through the rotor center hole.

3. An ultrasonic motor according to claim 1; wherein the rotor has an annular protrusion in contact with the vibrating body.

4. An ultrasonic motor according to claim 3; wherein the annular protrusion is provided at an outer portion of the vibrating body.

5. An ultrasonic motor according to claim 1; wherein the electrostrictive body compries a piezoelectric element.

6. An ultrasonic motor according to claim 5; wheren the piezoelectric element has a plurality of equally spaced-apart electrodes circumferentially disposed about the vibrating body, the gap between each of the electrodes being substantially $\frac{1}{2}$ the length of the arc defined by one of the electrodes.

7. An ultrasonic motor according to claim 5; wherein the piezoelectric element is substantially coextensive with the vibrating body.

8. An ultrasonic motor according to claim 1; wherein the rotor and the electrostrictive body are in contact with opposite sides respectively of the vibrating body.

9. An ultrasonic motor according to claim 1; wherein the electrostrictive body and the rotor are in contact with the same side of the vibrating body.

10. An ultrasonic motor according to claim 1; wherein the pressure regulating means comprises a pair of magnets mounted on the support shaft, one of the magnets being forced against the rotor by magnetic repulsive forces acting between the magnets.

11. An ultrasonic motor according to claim 1; wherein the vibrating body is configured to undergo vibration in a primary oscillation mode with respect to the radial direction thereof.

12. An ultrasonic motor according to claim 1; wherein the support shaft is integrally connected with the vibrating body at the center hole thereof.

13. An ultrasonic motor according to claim 1; wherein the support shaft is fixedly secured to the surface portion of the vibrating body which defines the center hole thereof.

14. An ultrasonic motor according to claim 1; wherein the vibrating body has a uniform thickness.

15. An ultrasonic motor according to claim 1; including guiding means interposed between the support shaft and the rotor for guiding the rotor to undergo rotational movement.

16. An ultrasonic motor according to claim 15; wherein the guiding means has a center hole through which extends the second portion of the support shaft, the guiding means being fixed to the second portion of the support shaft.

17. An ultrasonic motor according to claim 16; wherein the guiding means comprises a tubular guide member in contact with the vibrating body.

18. An ultrasonic motor according to claim 1; wherein the outer diameter of the electrostrictive body is smaller than the outer diameter of the vibrating body.

19. An ultrasonic motor comprising: a base; a stationary support shaft fixed to the base; a stator fixed to the support shaft, the stator comprising a disk-shaped vibrating body having a center hole, and an electrostrictive body having a center hole and secured to one side of the disk-shaped vibrating body for exciting the vibrating body, the support shaft extending through the center holes in the vibrating body and the electrostrictive body and being fixed to the vibrating body at the center hole thereof; a rotor coaxial with the stator and being freely mounted on the support shaft so as to be rotationally driven around the support shaft by the stator when the vibrating body is excited; and biasing means for biasing the rotor continuously against the stator, the biasing means comprising a pair of magnets mounted on the support shaft, one of the magnets being forced against the rotor by magnetic repulsive forces acting between the magnets.

20. An ultrasonic motor according to claim 19; wherein the outer diameter of the electrostrictive body is smaller than the outer diameter of the vibrarting body.

21. An ultrasonic motor according to claim 20; wherein the rotor has an annular protrusion in contact with the vibrating body.

* * * * *